(12) United States Patent
Barkan et al.

(10) Patent No.: US 12,340,269 B2
(45) Date of Patent: *Jun. 24, 2025

(54) SCANNER UPGRADE MODULE FOR BI-OPTIC

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,630

(22) Filed: Jul. 31, 2023

(65) Prior Publication Data

US 2025/0045544 A1 Feb. 6, 2025

(51) Int. Cl.
G06K 7/14 (2006.01)
G06K 7/10 (2006.01)

(52) U.S. Cl.
CPC ....... *G06K 7/10722* (2013.01); *G06K 7/1413* (2013.01)

(58) Field of Classification Search
CPC .................. G06K 7/10722; G06K 7/1413
See application file for complete search history.

(56) References Cited

U.S. PATENT DOCUMENTS

2007/0084927 A1* 4/2007 Itou .................. G06K 7/1491
235/454

* cited by examiner

*Primary Examiner* — Jamara A Franklin
(74) *Attorney, Agent, or Firm* — Yuri Astvatsaturov (57) ABSTRACT

At least some embodiments of the present invention are directed to barcode readers having a housing with upper and lower portions, and a weigh platter. Additionally, the barcode readers include a first imaging assembly having a first imaging sensor, the first imaging assembly having a first field of view (FOV) directed through at least one of the substantially horizontal window or the substantially upright window of the housing, and a supplemental module removably coupled with at least one of the lower housing portion or the weigh platter. The supplemental module includes at least one supplemental imaging assembly having a supplemental imaging sensor having a supplemental FOV.

29 Claims, 10 Drawing Sheets

SCANNER UPGRADE MODULE FOR BI-OPTIC

BACKGROUND

Bi-optic barcode readers are commonly used in retail and grocery store venues to help facilitate various transaction. In particular, these bi-optic barcode readers rely on image data captured by one or more image sensors to conduct image analysis and perform various functions based on that analysis. In light of this, there is a continued need for further development associated with the ability to gather image-based data for bi-optic barcode reader use.

Accordingly, there is a need for improved accessories having improved functionalities.

SUMMARY

Barcode readers and assemblies are disclosed herein that include a housing having lower and upper housing portions, a weigh platter, a first imaging assembly, and a supplemental module. The lower housing portion has an upper surface facing a product scanning region and a substantially horizontal window. The upper housing portion extends above the lower housing portion with a substantially upright window. The weigh platter supports an object placed thereon for obtaining a weight thereof, and includes a central region extending in a transverse plane that includes a platter window, a proximal edge adjacent the upper housing portion, a first lateral edge extending non-parallel to the proximal edge, a second lateral edge opposite the first lateral edge that extends non-parallel to the proximal edge, and a distal edge opposite the proximal edge that extends non-parallel to the first and second lateral edges. The first imaging assembly has a first imaging sensor and has a first field of view (FOV) directed through at least one of the substantially horizontal window or the substantially upright window. The supplemental module is removably coupled with at least one of the lower housing portion or the weigh platter near the distal edge of the weigh platter and includes at least one supplemental imaging assembly having a supplemental imaging sensor having a supplemental FOV.

In some examples, the supplemental module includes a housing having a coupling region to couple with at least one of the lower housing portion, the weigh platter portion, or a frame member. The housing defines a cavity to retain the at least one supplemental imaging assembly. In some of these examples, the supplemental module may include two supplemental imaging assemblies. The housing of the supplemental module may define first and second cavities to receive each of the supplemental imaging assemblies. Further, in such examples, the supplemental module may include an arm member that couples a portion of the housing defining the first and second cavities. In these and other examples, the first and/or the second cavity may extend upwardly through at least one opening formed by the weigh platter or extend upwardly above the platter window while being covered by a feature of the platter.

In some approaches, the supplemental module is at least partially disposed within a portion of the lower housing portion that extends above the weigh platter at the distal edge thereof. In some examples, the supplemental module extends above the weigh platter to a height of no more than approximately 1 inch.

In some approaches, the supplemental FOV is directed at the product scanning region towards the upper housing portion thereof. In some examples, the supplemental FOV does not pass through the substantially horizontal window.

In some examples, the at least one supplemental imaging assembly includes a leading edge substantially tilted in a direction above the horizontal platter. In some of these examples, the leading edge is tilted at an angle between approximately 25° and 60° relative to a centerline of the product.

Further still, in some examples, the at least one supplemental imaging assembly includes an illumination system adapted to illuminate a portion of the product scanning region. The barcode reader may further include a visual indicator adapted to indicate a direction of the FOV. Further, in some examples, the visual indicator may include an aiming system. Further still, in some examples, the visual indicator may be visible on at least one of the upper housing portion or the weigh platter.

In these and other approaches, the barcode reader may include a decoding indicator that conveys an indication of which FOV decoded the barcode. In some examples, the at least one image is processed within the supplemental module.

In accordance with a second aspect, a barcode reader includes a housing, a weigh platter, a first imaging assembly, a second imaging assembly, and a supplemental module. The housing includes a lower housing portion with an upper surface facing a product scanning region and a substantially horizontal window and an upper housing portion extending above the lower housing portion with a substantially upright window. The weigh platter is adapted to support an object placed thereon for obtaining a weight of the object and includes a central region extending in a transverse plane, the central region including a platter window configured to permit light to pass therethrough, a proximal edge adjacent the upper housing portion, a first lateral edge extending non-parallel to the proximal edge, a second lateral edge, opposite the first lateral edge, extending non-parallel to the proximal edge, and a distal edge, opposite the proximal edge, extending non-parallel to the first and second lateral edges. The first imaging assembly includes a first imaging sensor and has a first field of view (FOV) directed through the substantially horizontal window. The second imaging assembly includes a second imaging sensor and has a second field of view (FOV) directed through the substantially upright window. The supplemental module is adapted to couple with at least one of the lower housing portion, the weigh platter near the distal edge of the weigh platter, or a frame member. The supplemental module includes at least one supplemental imaging assembly having a supplemental imaging sensor having a supplemental FOV.

In accordance with a third aspect, a barcode reader is provided that includes a housing, a weigh platter configured to support an object placed thereon for obtaining a weight thereof, a first imaging assembly, a second imaging assembly, and a supplemental module. The housing includes a lower housing portion with an upper surface facing a product scanning region and a substantially horizontal window and an upper housing portion extending above the lower housing portion with a substantially upright window. The weigh platter includes a central region extending in a transverse plane and a platter window configured to permit light to pass therethrough, a proximal edge adjacent the upper housing portion, a first lateral edge extending non-parallel to the proximal edge, a second lateral edge, opposite the first lateral edge, extending non-parallel to the proximal edge, and a distal edge, opposite the proximal edge, extending non-parallel to the first and second lateral edges. The first imaging assembly has a first imaging sensor and a first field of view (FOV) directed through the substantially horizontal window. The second imaging assembly has a second imaging sensor and a second field of view (FOV) directed through the substantially upright window. The supplemental module is removably coupled with at least one of the lower housing portion, the weigh platter near the distal edge thereof, or a frame member and includes a housing having a first body region defining a first cavity, a second body region defining a second cavity, and a coupling region adapted to couple with at least one of the lower housing portion or the weigh platter portion, a first supplemental imaging assembly at least partially disposed within the first cavity, the first supplemental imaging assembly having a first supplemental imaging sensor having a first supplemental FOV, a second supplemental imaging assembly at least partially disposed within the second cavity, the second supplemental imaging assembly having a second supplemental imaging sensor having a second supplemental FOV. The first supplemental FOV and the second supplemental FOV are directed such that they define a supplemental overlap region positioned within approximately 1" forward of the distal edge of the weigh platter.

In accordance with a fourth aspect, a supplemental imaging module is provided that includes a housing, a first supplemental imaging assembly, and a second supplemental imaging assembly. The housing has a first body region defining a first cavity, a second body region defining a second cavity, and a coupling region adapted to couple with a portion of a barcode reader. The first supplemental imaging assembly is at least partially disposed within the first cavity and has a first supplemental imaging sensor having a first supplemental FOV. The second supplemental imaging assembly is at least partially disposed within the second cavity and has a second supplemental imaging sensor having a second supplemental FOV.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, an example imaging system is provided that includes a supplemental module that effectively increases an overall field of view (FOV) of the imaging system. More specifically, in some arrangements, the supplemental module may provide improved scanning performance of objects positioned near or otherwise adjacent to the imaging system.

Figure 1:
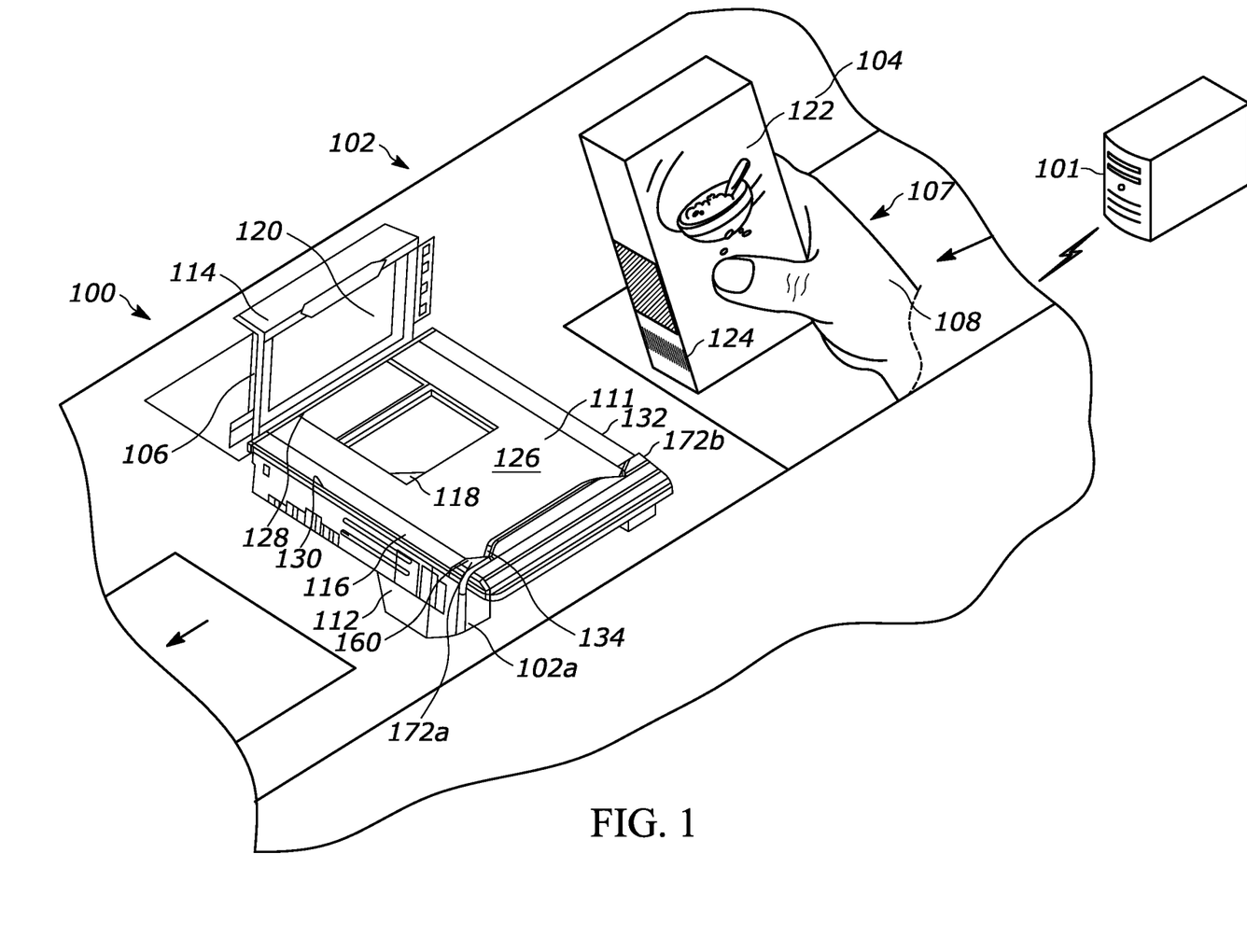
FIG. 1 is a perspective view of an example imaging system, implemented in an example point-of-sale (POS) system, having a bi-optical (also referred to as "bi-optic") barcode reader having a weigh platter.

FIG. 1 illustrates a perspective view of an example imaging system capable of implementing operations of the example devices. In the illustrated example, an imaging system 100 is in the form of a point-of-sale (POS) system, having a workstation 102 with a workstation surface (e.g., a counter) 104 and a bi-optical (also referred to as "bi-optic") barcode reader 106.

In the illustrated example, the barcode reader 106 includes an upper housing 114 (also referred to as an upper portion, tower portion, or upper housing portion) and a lower housing 112 (also referred to as a lower portion, platter portion, or lower housing portion). The upper housing 114 is characterized by an optically transmissive window 120 positioned there along a generally vertical plane and a horizontally extending field of view(s) which passes through the window 120. The lower housing 112 is characterized by a weigh platter 111 that includes an optically transmissive window 118 positioned there along a generally horizontal plane and a vertically extending field of view(s) which passes through the window 118. The weigh platter 111 is a part of a weigh platter assembly that will generally include the weigh platter 111 and a scale configured to measure the weight of an object placed on an example surface of a top portion 116, or some portion thereof. While in some instances the weigh platter 111 is fixedly secured to the lower housing 112, in other implementations it is removable by the barcode reader operator. This can be done to, for example, clean under the platter or to replace the platter after wear and tear. As used herein, the term near should at least be interpreted as being within two inches from a given feature. In other implementations, the term near should at least be interpreted as being within one inch, half inch, or quarter inch from a given feature.

In operation, a user 108 generally passes an item 122 across a product scanning region of the barcode reader 106 in a swiping motion in the general direction 107, which in the illustrated example is right-to-left. It should be appreciated that while items may be swiped past the barcode reader 106 in either direction, items may also be presented into the product scanning region by means other than swiping past the window(s). When the item 122 comes into the any of the fields of view of the reader, the barcode 124 on the item 122 is read and decoded by the barcode reader 106 and corresponding data is transmitted to a communicatively coupled host 101. In other instances, items may need to be weighed in order to be added to the ledger of the transaction. In this case, an item is placed on the top surface 116 of the platter 111 for the barcode reader 106 to sense the weight of said item and transmit information associated with this weight to the host 101. Additionally, image data may be processed for other purposes, such as, for example, potential ticket switching, sweethearting, or other types of shrink-related events. Further to that, image data captured by various imaging assemblies may be used for other purposes like, transitioning from a stand-by mode to a reading mode (i.e., waking up a scanner).

In a preferred embodiment the weigh platter 111 of the barcode reader 106 has various features. Specifically, it includes a central region 126 extending in a transverse plane. In most cases the central region 126 includes a platter window 118 configured to permit light to pass therethrough. This light may both, be emitted from within the lower housing 112 and travel into the interior of the lower housing 112 for capture by various imaging components. The weigh platter 111 further includes a series of edges which, in the illustrated example, include a proximal edge 128 adjacent the upper housing portion 114, a first lateral edge 130 extending non-parallel to the proximal edge 128, a second lateral edge 132 opposite the first lateral edge 130 and extending non-parallel to the proximal edge 128, and a distal edge 134 opposite the proximal edge 128 and extending non-parallel to the first and second lateral edges 130, 132. In the illustrated embodiment, the proximal, lateral, and distal edges form a substantially square shape. However, other shapes are within the scope of this disclosure and the edge arrangement can, for example, result in the weight platter 111 having a substantially rectangular shape whereby lateral edges 130 and 132 are longer than the perpendicularly positioned proximal and distal edges 128 and 134. Similarly, the edge positioning can result in the weigh platter having other regular or irregular shapes.

Figure 2:
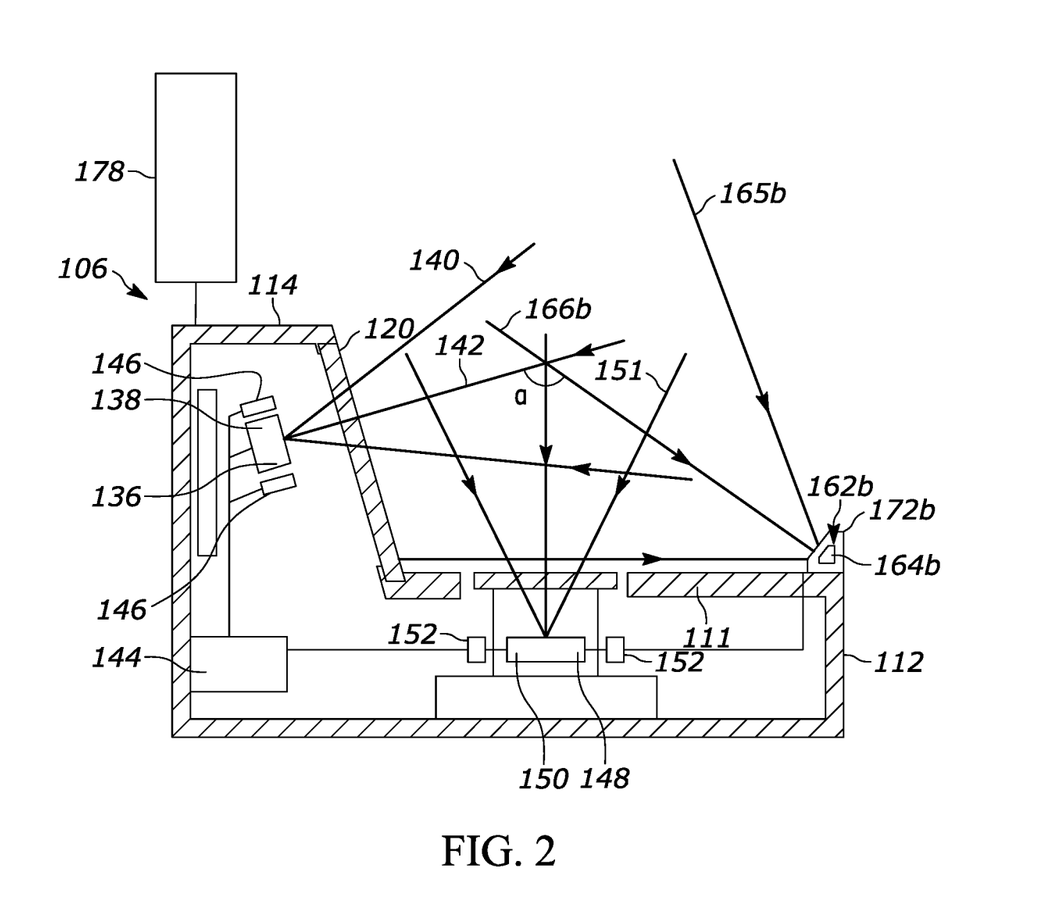
FIG. 2 is a schematic block diagram of an example barcode reader in accordance with an embodiment of the present invention.

As can be seen in the block diagram of FIG. 2, the barcode reader 106 includes a first imaging assembly 136 that includes a first imaging sensor 138 with a respective imaging lens or lens group. Imaging sensor 138 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by the respective lens group over an imaging field of view (FOV) 140 along an imaging axis 142 that is normal to the substantially flat image sensor 138 through the substantially upright window 120. The return light is scattered and/or reflected from an item over the FOV. In some embodiments, the imaging axis 142 is coaxial with a central axis of the lens group. The lens group is operative for focusing the return light onto the array of pixels to enable the characteristics (e.g., barcode(s)) associated with the item to be read. In particular, the light that impinges on the pixels is sensed and the output of those pixels produce image data that is associated with the environment that appears within the FOV (which can include the target). This image data may be processed by a controller 144 (e.g., by being sent to a decoder) which identifies and decodes decodable indicia captured in the image data. Once the decode is performed successfully, the reader can signal a successful "read" of the target (e.g., a barcode).

In addition to the imaging sensor 138, the imaging assembly 136 can include one or more illumination sources 146 operable to provide light that is directed into the product scanning region through the substantially upright window 120. Under typical conditions, when the imaging sensor 138 is operating to capture light from the product scanning region to produce image data, illumination sources 146 are activated to provide illumination of the target and hence enhance visibility of the target as "seen" by the imaging sensor 138. In a preferred embodiment, the one or more illumination sources 146 comprise a light emitting diode (LED) that is synchronized, at least partially, with the exposure of the imaging sensor 138.

It should be appreciated that the barcode reader 106 can be configured with one or more primary imaging assemblies that direct various FOVs through the combination of the substantially vertical and substantially horizontal windows 120, 118. To that end, if a single imaging assembly is used, various mirror arrangements can be employed to split the assembly's FOV and direct one portion of that FOV through window 120 and direct another portion of that FOV through windows 118. This can include one or more splitter mirrors and/or one or more folding mirrors whereby the various portions of the FOV can be directed in a desired manner.

Alternatively, and as illustrated, multiple imaging assemblies can be used. For example, the barcode reader 106 can employ a second imaging assembly 148 that is similar in operation to imaging assembly 136. That is, the imaging assembly 148 can include a second imaging sensor 150 along with a respective lens or lens group and one or more illumination sources 152 operable to provide light that is directed into the product scanning region through the substantially horizontal window 118. Under typical conditions, when the second imaging sensor 150 is operating to capture light from the product scanning region over FOV 151 to produce image data, illumination sources 152 are activated to provide illumination of the target and hence enhance visibility of the target as "seen" by the imaging sensor 150. In a preferred embodiment, the one or more illumination sources 152 comprise a light emitting diode (LED) that is synchronized, at least partially, with the exposure of the imaging sensor 150.

It is to be appreciated that any of the imaging assemblies 136, 148 may be in the form of bioptic scanner.

While not expressly illustrated, it should be appreciated that the position and orientation of the imaging assemblies disclosed herein are merely provided as examples, and unless otherwise indicated, these assemblies can be positioned anywhere within the upper and lower housing along with any mirrors which allow for any of the one or more FOVs to be redirected in a desired manner.

The bi-optic barcode reader 106 further includes a supplemental module 160 that includes any number of supplemental imaging assemblies 162. In the illustrated example, the supplemental module 160 is positioned near the distal edge 134 of the weigh platter 111. While the illustrated examples depict a supplemental module 160 that includes two supplemental imaging assemblies 162, it is to be appreciated that other implementations may include fewer or more imaging assemblies as desired. As with the first and second imaging assemblies 136, 148, a first supplemental imaging assembly 162a includes an imaging sensor 164a with a respective imaging lens or lens group, and similarly, a second supplemental imaging assembly 162b includes an imaging sensor 164b with a respective imaging lens or lens group. In some examples, the imaging sensors 164a, 164b are solid-state devices, for example, CCD or a CMOS imagers, having a one-dimensional array of addressable image sensors or pixels arranged in a single row, or a two-dimensional array of addressable image sensors or pixels arranged in mutually orthogonal rows and columns, and operative for detecting return light captured by the respective lens group over an imaging fields of view (FOV) 165a, 165b along imaging axes 165a, 165b that are each normal to the substantially flat image sensors 164a, 164b. The return light is scattered and/or reflected from objects over the FOV. In some embodiments, the imaging axes are each coaxial with a central axis of the respective lens group, each of which is operative for focusing the return light onto the array of pixels to enable focused capture of image data of an environment appearing within the respective FOVs 165a, 165b. In particular, the light that impinges on the pixels is sensed and the output of those pixels produce image data that is associated with the environment that appears within the FOV (which can include the target). This image data may be processed by the controller 144. Additionally, or alternatively, it may be processed by a separate supplemental controller 168 which may be disposed within or otherwise coupled with the supplemental module 160. Furthermore, controllers 144 and 168 may be communicatively coupled with each other to enable desired functionality.

Figure 3:
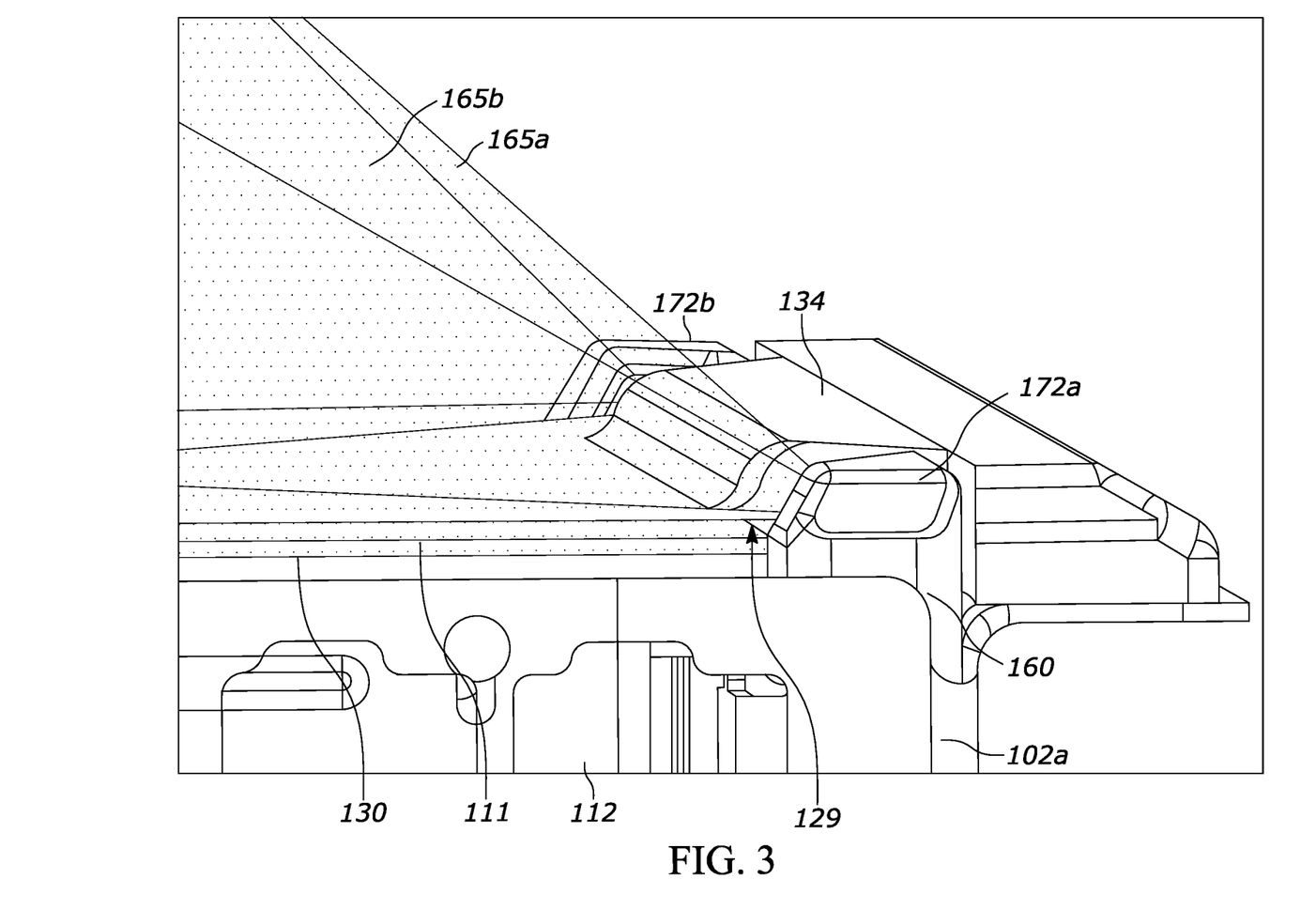
FIG. 3 is a perspective view of a distal portion of an exemplary weigh platter for use with the barcode reader of FIG. 1 together with an imaging assembly positioned near thereto.
Figure 7:
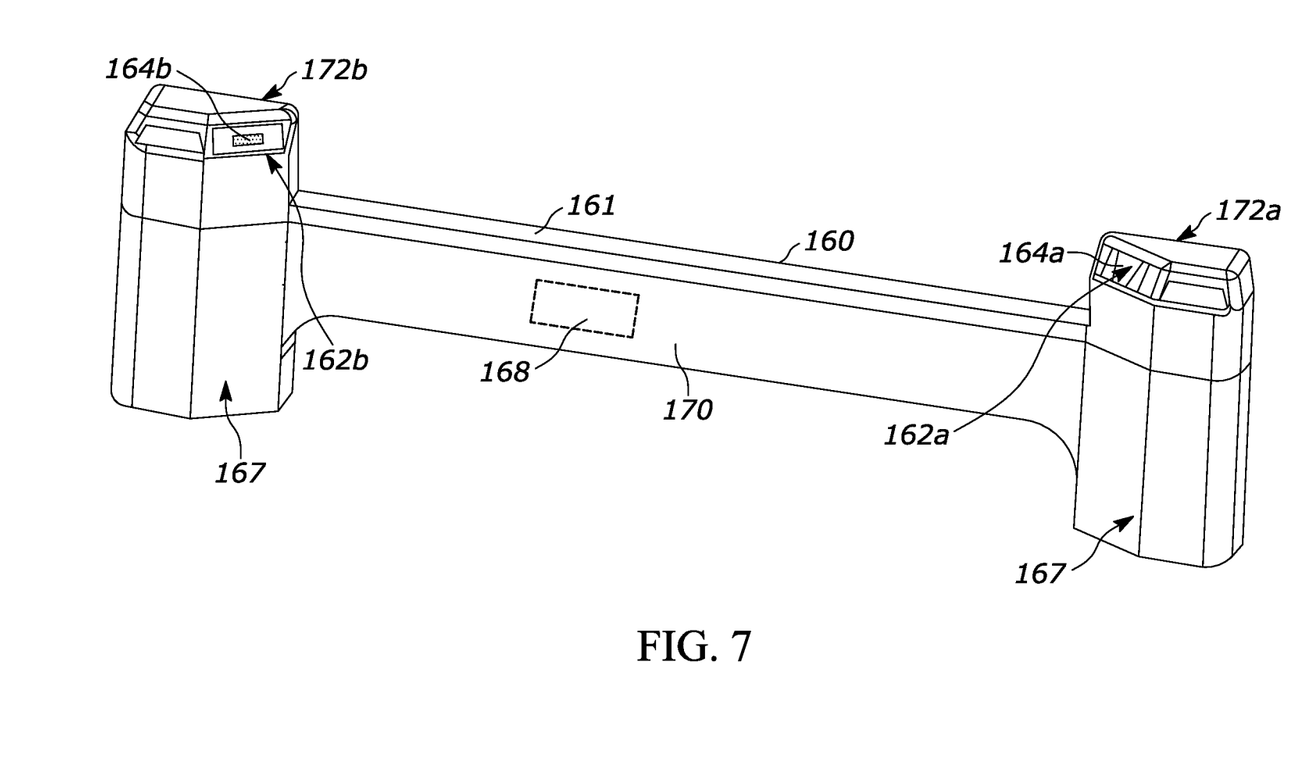
FIG. 7 is a perspective view of an example supplemental module for use with the barcode reader of FIG. 1 together with an imaging assembly positioned near thereto.
Figure 8:
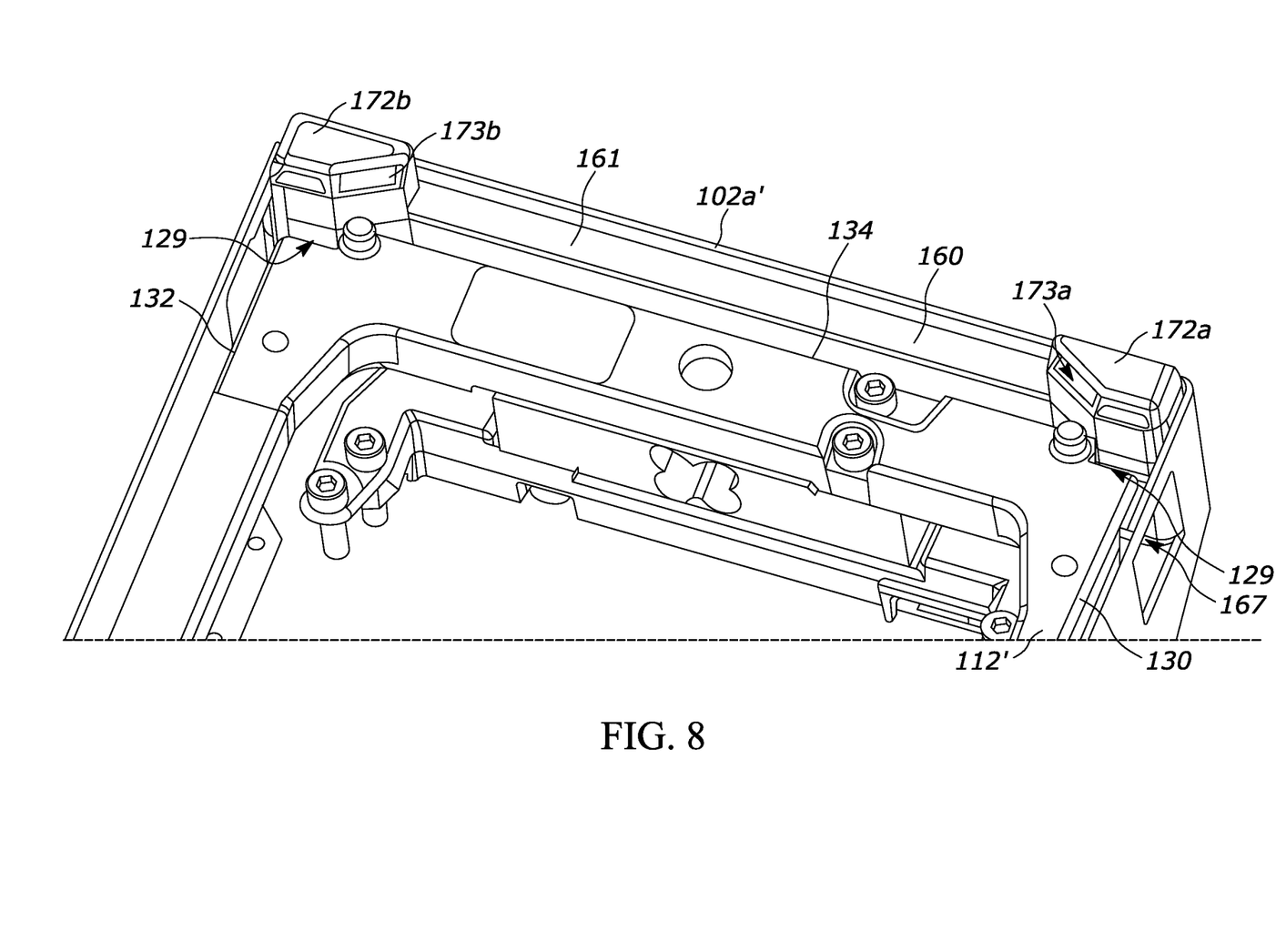
FIG. 8 is a perspective view of a distal portion of an example weigh platter and supplemental module for use with the barcode reader of FIG. 1 together with an imaging assembly positioned near thereto.
Figure 10:
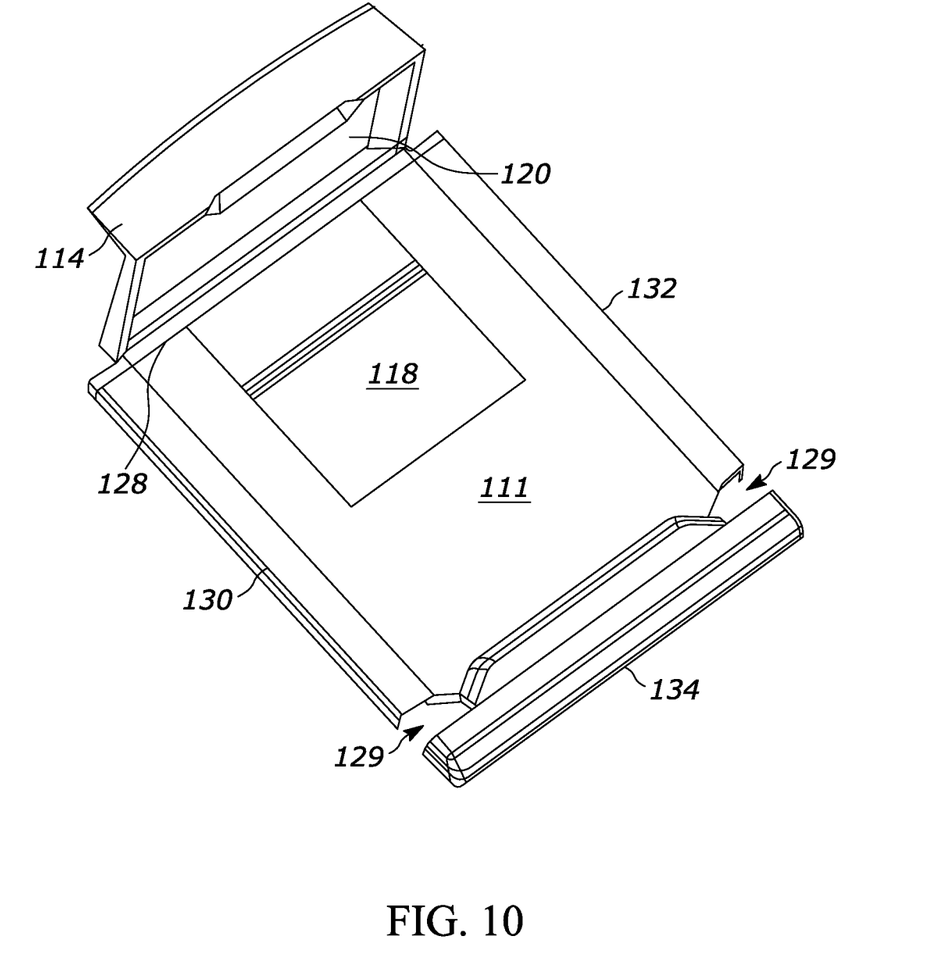
FIG. 10 is a perspective view of an example weigh platter for use with the barcode reader of FIG. 1.

With particular reference to FIG. 7, the supplemental module 160 includes a housing 161 having an arm 170 operably connecting respective first and second supplemental imaging housings 172a, 172b. In some implementations, the arm 170 may include an interior cavity that houses electronics, data and/or power communication cables, and/or interconnects. Each of the supplemental imaging housings 172a, 172b include an interior cavity 173a, 173b that accommodate at least a portion of the supplemental imaging assemblies 162a, 162b. Further, the supplemental module 160 includes any number of coupling regions 167 to allow the supplemental module 160 to be operably coupled with the imaging system 100. More specifically, in some examples, the supplemental module 160 may couple (e.g., removably couple) with a portion of the lower housing 112, the weigh platter 111, and/or a frame member 102a (see FIG. 3) of the workstation 102. Such removable couplings may be provided in any suitable manner such as, for example, a friction-fit coupling, a notch-and-protrusion coupling, and/ or by using fasteners or other securing mechanisms. Other examples are possible. In some examples, and as illustrated in FIGS. 8, 10, & 11, the intersections of the first and second lateral edges 130, 132 with the distal edge 134 of the weigh platter 111 may include cutout regions 129 that accommodate respective portions of the supplemental imaging housings 172a, 172b. It is to be appreciated that any number of desired alignment features such as, for example, grooves, notches, ribs, and the like, may be provided on the supplemental module 160 and/or portions of the frame member 102a, the lower housing 112, and/or the weigh platter 111. Other arrangements are possible.

In some implementations, it may be advantageous to couple the supplemental module 160 with a portion of the lower housing 112 or the frame member 102a as opposed to coupling with the weigh platter 111 to avoid impeding movement of the weigh platter 111. More specifically, in some environments, the weigh platter 111 undergoes a certification to ensure it is providing accurate measurements. In the event that the supplemental module 160 includes wires and/or other components that could interfere with the free-loading nature of the weigh platter 111, mounting the supplemental module 160 to a different component may reduce and/or eliminate such potential interference with weighing accuracy.

In some embodiments, the weigh platter 111 may include a transparent cover to shield the supplemental imaging assemblies 162a, 162b from debris or items being dragged across the platter. In this implementation, the imaging assemblies 162a, 162b along with the supporting circuit board are supported by the lower housing portion 112. To enable the imaging assemblies 162a, 162b to have appropriately directed FOVs, it may be preferable to position at least a portion thereof above the top surface of the platter 111. As such, the weigh platter 111 can include appropriately formed cutouts 129 configured to accommodate the appropriate portions of the imaging assemblies 162a, 162b. Put differently, in some examples, portions of the supplemental imaging housings 172a, 172b and thus the cavities 173a, 173b formed thereby may extend upwardly through at least one opening or cutout 129 formed by the weigh platter 111 or may generally extend upwardly above the weigh platter 111 while being covered by a feature thereof (not illustrated). More specifically, in some examples, the platter may be designed to accommodate the supplemental imaging assemblies such that the top portion of the distal end of the platter extends above the main portion (e.g., where the platter window is disposed) of the platter. In examples where the supplemental module 160 is disposed within a portion of the lower housing portion 112, such a portion itself may extend above the weigh platter 111. In some examples, the supplemental module 160 may extend above the weigh platter 111 to a height no more than approximately 1" so as to reduce potential interference when a user moves an item across the weigh platter 111.

Additionally, the supplemental imaging housings 172a, 172b can form a cover or a suitable vertically extending protrusion configured to protect the imaging assemblies 162a, 162b from foreign items that may come in contact therewith.

Referring now to FIGS. 2-6, the various fields of view of the imaging assemblies will now be described. More specifically, the FOVs 165a, 165b of the supplemental imaging assemblies 162a, 162b may be oriented in the direction of the product scanning region in any desirable manner. In some implementations the FOVs 165a, 165b of the supplemental imaging assemblies 162a, 162b are oriented with respect to the FOV 140 of the first imaging assembly 136 such that the angle α between the optical axis 142 and respective imaging axes 166a, 166b exceeds 90 degrees. In a preferred embodiment, this angle α is between 110 degrees and 180 degrees. Other examples are possible.

Notably, the FOVs 165a, 165b of the supplemental imaging assemblies 162a, 162b may be angled or otherwise tilted with respect to the horizontal plane and/or the weigh platter 111. As will be discussed, such an arrangement advantageously complements the positioning of the first imaging assembly 136 to provide an improved scannable region above the weigh platter 111 and to combine for 360° coverage around a vertical and a horizontal axis in the product scanning region.

Figure 4:
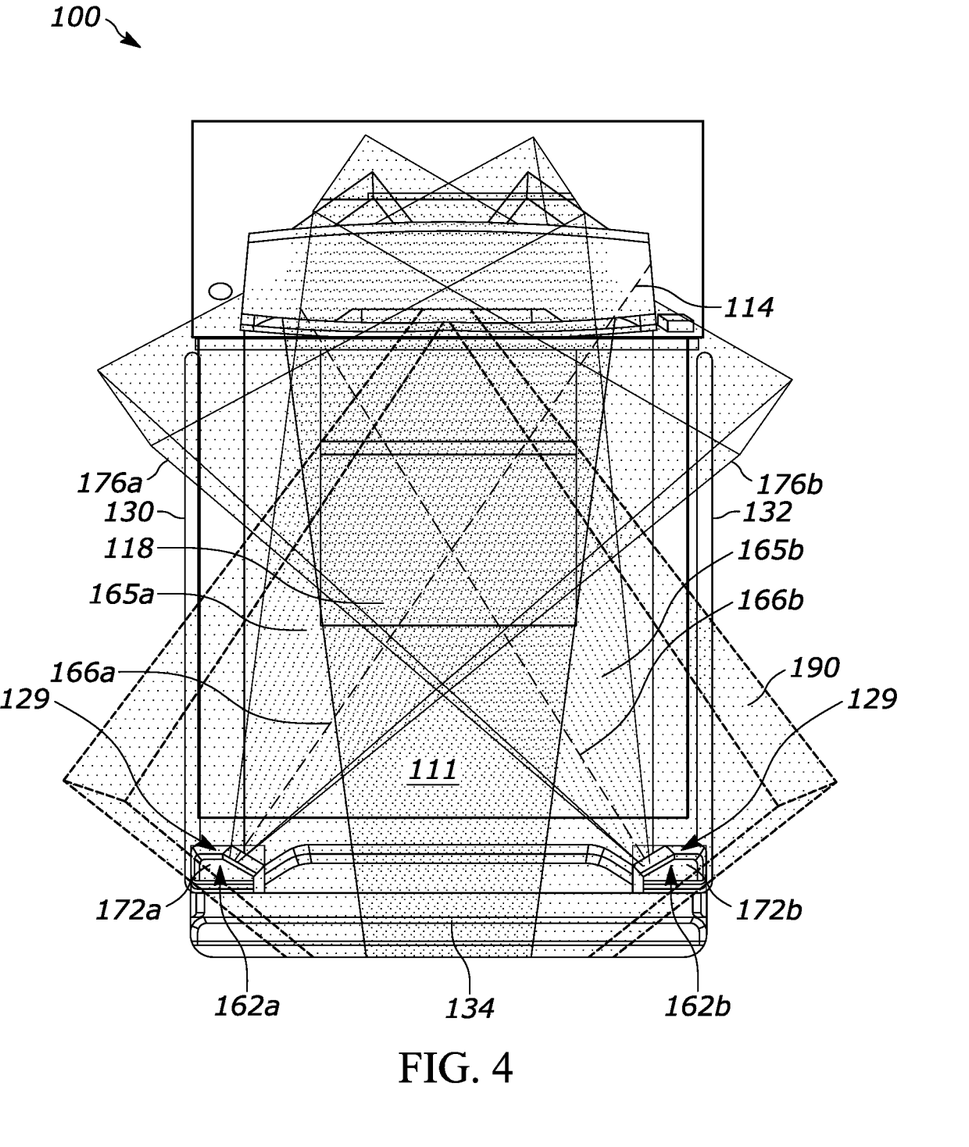
FIG. 4 is a top view of an example barcode reader in accordance with an embodiment of the present invention.

While the FOVs 165a, 165b can have any desired cross-section, in a preferred embodiment, they each are in the form of a rectangular cross-section. With particular reference to FIG. 4, the second supplemental imaging sensor 164b has a FOV 165b having a first lateral boundary 176a extending above the first lateral edge 130 of the weigh platter 111 and a second lateral boundary 178a extending above the weigh platter 111 such that the FOV 165b encompasses all or substantially all of the window 118. Further, the first supplemental imaging sensor 164a has a FOV 165a having a first lateral boundary 176b that extends above the weigh platter 111 and a second lateral boundary 178b that extends above the second lateral edge 132 such that the FOV 165a encompasses all or substantially all of the window 118. As shown in FIG. 4, these supplemental imaging assemblies 162a, 162b encapsulate greater than 50% of a region above the weigh platter 111 and interest at a point before the window 118. When the supplemental module 160 is used in conjunction with the first imaging assembly 136, the FOV 140 provides additional coverage in the region above the weigh platter 111, while the FOV 151 of the second imaging sensor 150 provides for a generally vertical coverage area that encapsulates the volume above the window 118.

Generally speaking, the FOVS 140, 151, 165a, 165b cooperate to cover the space above the weigh platter 111. Specific intersection angles may be determined by a standard with of the scanner and/or a standard length of the platter when accounting for a pixel resolution of each imaging sensor 138, 150, 164a, 164b.

It should be appreciated what any of the image sensors noted in this disclosure can be either monochrome or polychrome (i.e., colored). In implementations where polychrome image sensors are implemented, object recognition capabilities may be realized to assist with desired retail considerations.

While each of the imaging assemblies disclosed herein may include similar or identical components, data received from each of the assemblies may be processed in accordance with respectively predefined criteria. For example, image data received from imaging assemblies 136, 148, 162a, 162b may be processed primarily for the detection and decoding of barcodes that may appear within the respective FOVs. While this may be an objective of image analysis coming from these assemblies, this should not be interpreted as limiting and image data from these assemblies can further be used for object and/or object characteristic detection. Additionally, image data received from any of the image assemblies can be in a form of singular images, image sets, or video streams comprising a plurality of images. It should also be appreciated that the processing of the data from these assemblies can occur via different physical and/or logical pipelines. For example, processing of image data obtained from the first or second imaging assemblies 136, 148 may be processed through a first processing pipeline, and the processing of image data obtained from the supplemental imaging assemblies 162a, 162b may be processed through a separate processing pipeline. In such examples, the second processing pipeline may be at least partially implemented within the supplemental module 160 itself and may include non-barcode decoding vision operations (e.g., the processing of image data for the detection of an item). These modules can be logically different or they may be implemented on separate hardware components.

So arranged, the multi-directional orientation of the various FOVs of a barcode reader described herein can also be advantageously used to render an at-least partial three-dimensional representation of an item presented in the product scanning region of the barcode reader 106 and/or determine a dimension associated with the item presented in the product scanning region of the barcode reader 106. This can be done in accordance with the processing criteria described above. The optical arrangements described here provide for a robust system to read codes facing in every direction depending on how the field of use is oriented. The supplemental module 160 provides a field-upgradeable module that may increase the overall FOV in a retrofit manner. In some arrangements, the supplemental module 160 may include components to provide for a "plug-and-play" arrangement whereby power and/or data transmission may be quickly initiated via the use of electronic couplings and/or connectors. The supplemental module 160 may include instructions for synchronizing with the first and the second imaging assemblies 136, 148.

It is to be appreciated that in some examples, the imaging system 100 may include any number of additional features to assist with usability. For example, in some embodiments, the barcode reader 106 can be connected to or include a point-of-sale user interface (POSUI). The POSUI can be communicatively coupled to the barcode reader 106 and can be generally positioned at or near the upper housing portion 114. The POSUI can include devices like a display (touch-screen or passive), keyboard, credit-card processing device, and the like. In some embodiments, the supplemental module 160, which may be generally oriented towards the POSUI, is configured such that its FOVS 165a, 165b, or at least a portion thereof, are directed in a generally upward direction (such as what is shown in FIG. 2) such that the at least the portion of these FOVs capture at least some portion of the POSUI. Having image data that includes the POSUI can help identify instances of shrink events. For example, when an item is scanned and entered into the transaction log, a user may subsequently interact with the POSUI to remove that item from the transaction or otherwise alter its price. Having image data (in the form of photographs or video) can help identify instances of such behavior and trigger appropriate mitigating response(s). in other examples, the POSUI may provide a video feed of any number of the provided FOVs to assist with usability of the workstation 102.

In some examples, the system 100 may include any number of indicators to improve usability. For example, a visual indicator may be provided that directs a user towards the product scanning region. In some examples, such a visual indicator may be in the form of a marking (e.g., an etching, a label, and the like) disposed on or near the weigh platter 111. In other examples, any number of the supplemental imaging housings 172a, 172b may include an indicator such as an arrow on an upper surface thereof that is directed in the direction of the FOV 165a, 165b. Other examples are possible.

In some examples, an aiming assembly (not illustrated) may also be provided. Such an assembly may provide a visual indicator for the location of the imaging axes 166a, 166b, and may be visible on the product during scanning.

The system 100 may include any number of additional indicators such as, for example, a decoding indicator that provides an indication of which imaging assembly 136, 148, 162a, 162b captured an image of the item 122. For example, a light pattern or an audible indicator may be provided having unique visual and/or audible indicators associated with each imaging assembly to convey information about which imaging assembly decoded the barcode and/or otherwise captured an image. In other examples, each imaging assembly may have a light positioned in close proximity thereto that may illuminate when the specific imaging assembly captures an image. The system 100 may additionally track such image capture events to assist with determining how users engage the workstation 102 to scan products.

In some examples, the supplemental module 160 may include an illumination assembly (not illustrated). In some examples, different illumination assemblies may be provided for each of the supplemental imaging assemblies 162a, 162b. In any of these arrangements, the illumination assembly or assemblies may be configured such that they generate a light pattern that terminates at a point that matches an upper edge of the upper housing 114 to prevent light from shining in a user's eyes.

Figure 9:
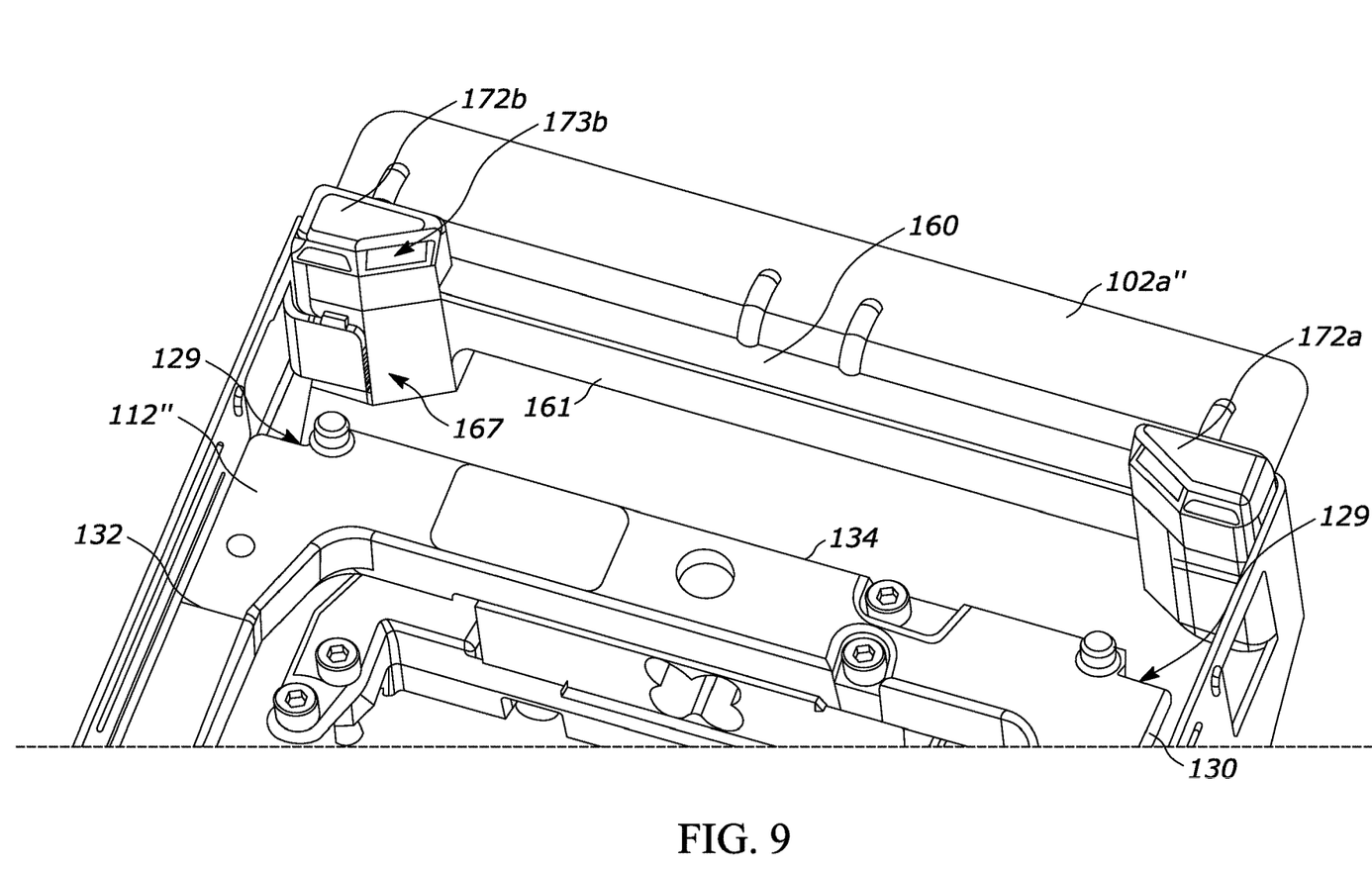
FIG. 9 is a perspective view of a distal portion of an alternative example weigh platter and supplemental module for use with the barcode reader of FIG. 1 together with an imaging assembly positioned near thereto.

The supplemental module 160 described herein may be used with differently-dimensioned workstations 102. For example, with reference to FIGS. 8 and 9, which illustrate alternative lower housings 112', 112" and frame members 102a', 102a", the respective weigh platters may be dimensioned such that the supplemental module is positioned at different lengths from the window. In any of these implementations, the resulting FOVs of the supplemental module may be arranged such that they intersect within approximately 2.5" from the distal edge of the respective weigh platter.

Figure 5:
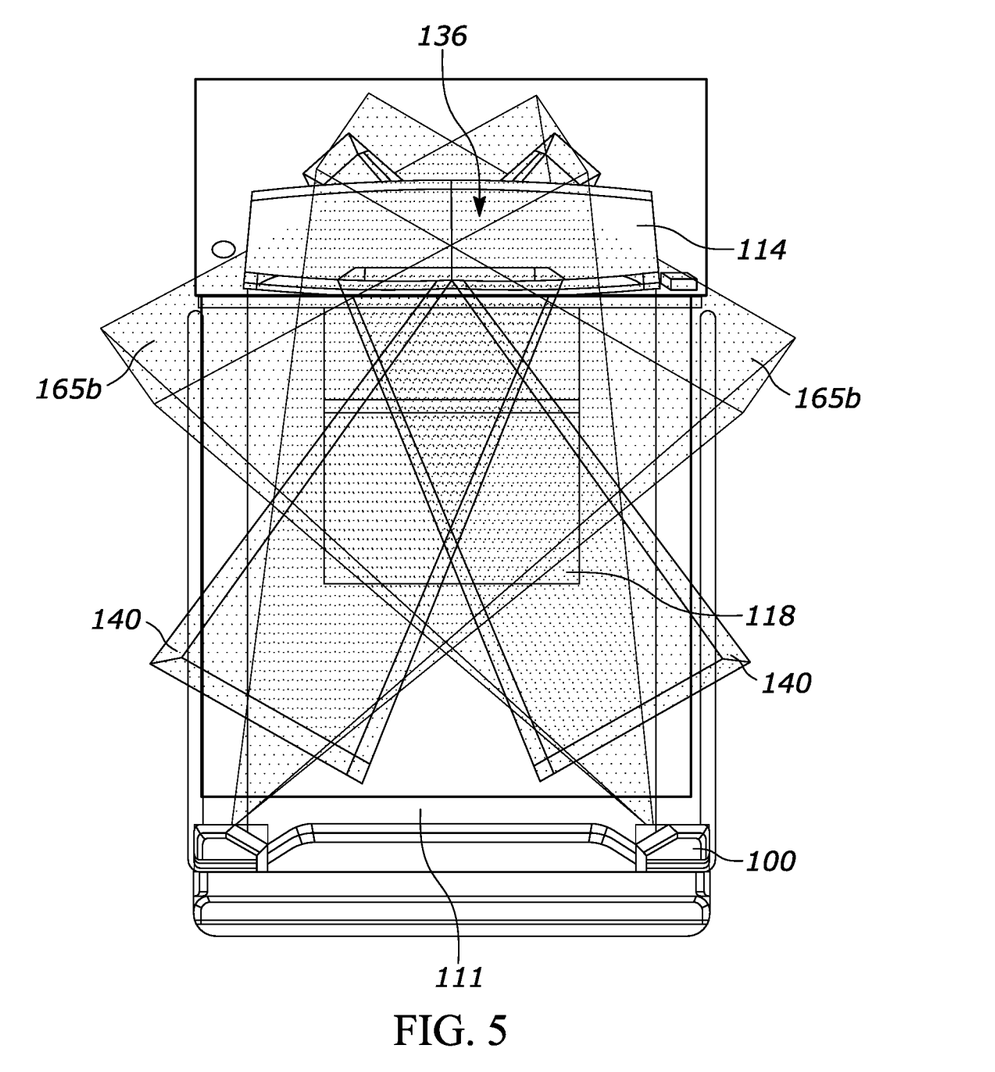
FIG. 5 is a top view of an alternative example barcode reader in accordance with an embodiment of the present invention.
Figure 6:
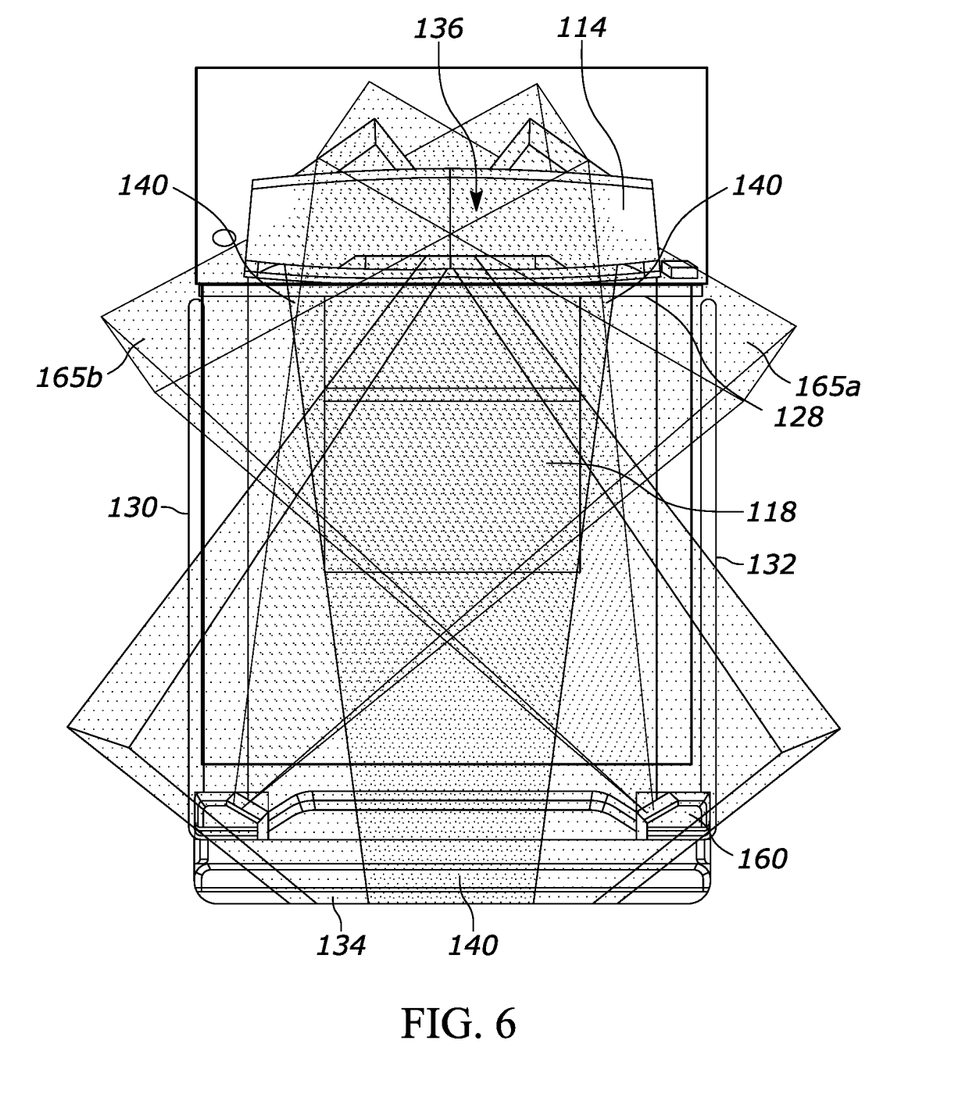
FIG. 6 is a top view of an alternative example barcode reader in accordance with an embodiment of the present invention.

Further, in some examples and as illustrated in FIGS. 5 and 6, the first imaging assembly 136 may be in the form of a bioptic reader that has a number of FOVs. In these examples, the imaging assembly includes two (FIG. 5) or three (FIG. 6) FOVs. It is to be appreciated that other arrangements are possible.

In yet other examples (not illustrated) the supplemental module may not include an arm, and instead may be provided as two (or more) discrete supplemental imaging housing or modules.

Having image data from the various orientations disclosed herein can be advantageously used to detect shrink events. For example, a shrink event can be identified by (i) processing image data from the image assemblies 136, 148 to identify an item identifier based on an indicia (like a barcode) present in the first image data, (ii) processing the image data from the supplemental imaging assemblies 162a, 162b to identify an item characteristic based on a physical appearance of the item present in that data, and (iii) detecting a mismatch between the item identifier and the item characteristic. For instance, image data from the image assemblies 136, 148 can include a barcode that is associated with first item. On the other hand, image data from the imaging assemblies 162a, 162b can be analyzed to determine that the item appearing with said image data does not display physical characteristics (shape, color, texture, etc.) that should be associated with the first item or includes physical characteristics not associated with the first item. Such a mismatch can be the basis for a potential shrink event and can be used to generate either an alert local to the barcode reader 106 and/or the POSUI, be transmitted to appropriate personnel, cause a transaction receipt to include an appropriate marking, and so on.

Similarly, image data from the imaging assemblies 136, 148, 162a, 162b can be processed to detect movement within the product scanning region during a timeframe, identify a lack of a decodable indicia being present in the image data during the timeframe, and identify an item being present in the scanning region during the timeframe. Such event can again signal a potential shrink event as an item has been passing through a product scanning region without being added to a transaction log.

The embodiments described herein may be particularly useful for instances where liquids find their way onto the platter of barcode readers. It has been recognized that liquids, when spilled on existing platters have a tendency to transition to regions below the platter, causing structural and electrical issues with barcode readers like those described herein. Similarly, matter which may come off produce can similarly pose issues when it finds its way below the platter. Providing the configurations disclosed herein may reduce those instances as these configurations may help retain foreign matter on a top surface of the platter, allowing a user to remove said matter without causing harm to the reader.

Additionally, such an arrangement described herein allows the central axis of the platter FOV to be vertical or essentially vertical, which may allow the platter FOV to be used more versatilely (e.g., for video-based operations). Because the supplemental imaging module includes imaging systems having FOVs that are facing the upper housing portion, an operator may advantageously capture images of barcodes which may be tilted towards the operator. By this virtue, the system is no longer as dependent on the imaging system disposed within the platter to capture images of such tilted barcodes. As such, the optics associated with the platter or generally horizontal FOV can be oriented perpendicular or substantially perpendicular (e.g., with approximately) 5° to the plane defined by the platter.

The above description may refer to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A barcode reader comprising:
 a housing having (i) a lower housing portion with an upper surface facing a product scanning region and a substantially horizontal window and (ii) an upper housing portion extending above the lower housing portion with a substantially upright window;
 a weigh platter configured to support an object placed on the weigh platter for obtaining a weight of the object, the weigh platter having:
  a central region extending in a transverse plane, the central region including a platter window configured to permit light to pass therethrough;
  a proximal edge adjacent the upper housing portion;
  a first lateral edge extending non-parallel to the proximal edge;
  a second lateral edge, opposite the first lateral edge, extending non-parallel to the proximal edge; and
  a distal edge, opposite the proximal edge, extending non-parallel to the first and second lateral edges;
 a first imaging assembly having a first imaging sensor, the first imaging assembly having a first field of view (FOV) directed through at least one of the substantially horizontal window or the substantially upright window;
 a supplemental module removably coupled with at least one of the lower housing portion, the weigh platter near the distal edge thereof, or a frame member, the supplemental module including at least one supplemental imaging assembly having a supplemental imaging sensor having a supplemental FOV.

2. The barcode reader of claim 1, wherein the supplemental module comprises a housing having a coupling region adapted to couple with at least one of the lower housing portion, the weigh platter portion, or a frame member, the housing defining a cavity to retain the at least one supplemental imaging assembly.

3. The barcode reader of claim 2, wherein the supplemental module comprises two supplemental imaging assemblies, the housing of the supplemental module defining a first cavity and a second cavity to receive each of the supplemental imaging assemblies.

4. The barcode reader of claim 3, further comprising an arm member adapted to couple a portion of the housing defining the first cavity and a portion of the housing defining the second cavity.

5. The barcode reader of claim 3, wherein the first cavity and/or the second cavity are adapted to: 1) extend upwardly through at least one opening formed by the weigh platter; or 2) extend upwardly above the platter window while being covered by a feature of the platter.

6. The barcode reader of claim 1, wherein the supplemental module is at least partially disposed within a portion of the lower housing portion that extends above the weigh platter at the distal edge thereof.

7. The barcode reader of claim 1, wherein the supplemental module extends above the weigh platter to a height of no more than approximately 1 inch.

8. The barcode reader of claim 1, wherein the supplemental FOV is directed at the product scanning region towards the upper housing portion.

9. The barcode reader of claim 1, wherein the supplemental FOV does not pass through the substantially horizontal window.

10. The barcode reader of claim 1, wherein the at least one supplemental imaging assembly includes a leading edge substantially tilted in a direction above the horizontal platter.

11. The barcode reader of claim 10, wherein the leading edge is tilted at an angle between approximately 25° and 60° relative to a centerline of the product.

12. The barcode reader of claim 1, wherein the at least one supplemental imaging assembly includes an illumination system adapted to illuminate a portion of the product scanning region.

13. The barcode reader of claim 1, further comprising a visual indicator adapted to indicate a direction of the FOV.

14. The barcode reader of claim 13, wherein the visual indicator comprises an aiming system.

15. The barcode reader of claim 13, wherein the aiming system is visible on at least one of the upper housing portion or the weigh platter.

16. The barcode reader of claim 1, further comprising a decoding indicator, the decoding indicator adapted to convey an indication of which FOV decoded the barcode.

17. The barcode reader of claim 1, wherein the at least one image is processed within the supplemental module.

18. A barcode reader comprising:
a housing having (i) a lower housing portion with an upper surface facing a product scanning region and a substantially horizontal window and (ii) an upper housing portion extending above the lower housing portion with a substantially upright window;
a weigh platter configured to support an object placed on the weigh platter for obtaining a weight of the object, the weigh platter having:
a central region extending in a transverse plane, the central region including a platter window configured to permit light to pass therethrough;
a proximal edge adjacent the upper housing portion;
a first lateral edge extending non-parallel to the proximal edge;
a second lateral edge, opposite the first lateral edge, extending non-parallel to the proximal edge; and
a distal edge, opposite the proximal edge, extending non-parallel to the first and second lateral edges;
a first imaging assembly having a first imaging sensor, the first imaging assembly having a first field of view (FOV) directed through the substantially horizontal window;
a second imaging assembly having a second imaging sensor, the second imaging assembly having a second field of view (FOV) directed through the substantially upright window;
a supplemental module removably coupled with at least one of the lower housing portion, the weigh platter near the distal edge of the weigh platter, or a frame member, the supplemental module including at least one supplemental imaging assembly having a supplemental imaging sensor having a supplemental FOV.

19. The barcode reader of claim 18, wherein the first FOV, the second FOV, and the supplemental FOV cooperate to optically allow an image of a specific size to be projected onto the sensor.

20. The barcode reader of claim 18, wherein the first FOV, the second FOV, and the supplemental FOV cooperate to combine for 360° coverage around a vertical and a horizontal axis in the product scanning region.

21. The barcode reader of claim 18, wherein the supplemental module comprises:
a housing having a first body region defining a first cavity, a second body region defining a second cavity, and a coupling region adapted to couple with at least one of the lower housing portion or the weigh platter portion,
a first supplemental imaging assembly at least partially disposed within the first cavity, the first supplemental imaging assembly having a first supplemental imaging sensor having a first supplemental FOV;
a second supplemental imaging assembly at least partially disposed within the second cavity, the second supplemental imaging assembly having a second supplemental imaging sensor having a second supplemental FOV;
wherein the first supplemental FOV and the second supplemental FOV are directed such that they define a supplemental overlap region at a location above the weigh platter.

22. The barcode reader of claim 21, wherein the supplemental module further comprises an arm member extending between and coupling the first body region with the second body region.

23. The barcode reader of claim 21, wherein each of the first supplemental FOV and the second supplemental FOV are directed at the product scanning region towards the upper housing portion.

24. The barcode reader of claim 18, wherein the first FOV axis passes through the weigh platter at an angle no greater than 5° off perpendicular relative to a plane defined by the weigh platter.

25. A barcode reader comprising:
a housing having (i) a lower housing portion with an upper surface facing a product scanning region and a substantially horizontal window and (ii) an upper housing portion extending above the lower housing portion with a substantially upright window;
a weigh platter configured to support an object placed on the weigh platter for obtaining a weight of the object, the weigh platter having:
a central region extending in a transverse plane, the central region including a platter window configured to permit light to pass therethrough;
a proximal edge adjacent the upper housing portion;
a first lateral edge extending non-parallel to the proximal edge;
a second lateral edge, opposite the first lateral edge, extending non-parallel to the proximal edge; and
a distal edge, opposite the proximal edge, extending non-parallel to the first and second lateral edges;
a first imaging assembly having a first imaging sensor, the first imaging assembly having a first field of view (FOV) directed through the substantially horizontal window;

a second imaging assembly having a second imaging sensor, the second imaging assembly having a second field of view (FOV) directed through the substantially upright window;

a supplemental module removably coupled with at least one of the lower housing portion or the weigh platter near the distal edge of the weigh platter, the supplemental module including:

a housing having a first body region defining a first cavity, a second body region defining a second cavity, and a coupling region adapted to couple with at least one of the lower housing portion or the weigh platter portion, a first supplemental imaging assembly at least partially disposed within the first cavity, the first supplemental imaging assembly having a first supplemental imaging sensor having a first supplemental FOV;

a second supplemental imaging assembly at least partially disposed within the second cavity, the second supplemental imaging assembly having a second supplemental imaging sensor having a second supplemental FOV;

wherein the first supplemental FOV and the second supplemental FOV are directed such that they define a supplemental overlap region positioned within approximately 1" forward of the distal edge of the weigh platter.

26. The barcode reader of claim 24, wherein the first FOV, the second FOV, the first supplemental FOV, and the second supplemental FOV cooperate to optically allow an image of a specific size to be projected onto the sensor.

27. The barcode reader of claim 24, wherein the first FOV, the second FOV, the first supplemental FOV, and the second supplemental FOV cooperate to combine for 360° coverage around a vertical and a horizontal axis in the product scanning region.

28. The barcode reader of claim 24, wherein the supplemental module further comprises an arm member extending between and coupling the first body region with the second body region.

29. The barcode reader of claim 24, wherein each of the first supplemental FOV and the second supplemental FOV are directed at the product scanning region towards the upper housing portion.

* * * * *